United States Patent
Kim et al.

(10) Patent No.: US 10,257,333 B2
(45) Date of Patent: Apr. 9, 2019

(54) ELECTRONIC DEVICE

(71) Applicant: LG ELECTRONICS INC., Seoul (KR)

(72) Inventors: Kyojin Kim, Seoul (KR); Sooyong Song, Seoul (KR); Joonhee Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/663,309

(22) Filed: Jul. 28, 2017

(65) Prior Publication Data

US 2018/0241861 A1    Aug. 23, 2018

(30) Foreign Application Priority Data

Feb. 20, 2017    (KR) .................. 10-2017-0022525

(51) Int. Cl.
| | |
|---|---|
| H04M 1/02 | (2006.01) |
| H04M 1/18 | (2006.01) |
| G06F 3/0354 | (2013.01) |
| H01H 25/00 | (2006.01) |

(52) U.S. Cl.
CPC .......... *H04M 1/18* (2013.01); *G06F 3/03548* (2013.01); *H04M 1/0235* (2013.01); *H04M 1/0264* (2013.01); *H04M 1/0274* (2013.01); *H01H 25/002* (2013.01); *H01H 2223/002* (2013.01); *H01H 2239/024* (2013.01); *H04M 1/026* (2013.01); *H04M 2001/0204* (2013.01)

(58) Field of Classification Search
CPC ... H01H 2223/00; H01H 2223/002–2223/004; H01M 1/18
See application file for complete search history.

(56) References Cited

U.S. PATENT DOCUMENTS

| | | | | |
|---|---|---|---|---|
| 9,804,003 | B2* | 10/2017 | Yang | G01D 11/245 |
| 9,872,408 | B2* | 1/2018 | Choi | H05K 5/069 |
| 2011/0255000 | A1* | 10/2011 | Weber | G03B 17/02 |
| | | | | 348/374 |
| 2017/0251564 | A1* | 8/2017 | Jun | H05K 5/069 |

* cited by examiner

*Primary Examiner* — Clayton E. LaBalle
*Assistant Examiner* — Linda B Smith
(74) *Attorney, Agent, or Firm* — Birch, Stewart, Kolasch & Birch, LLP

(57) ABSTRACT

An electronic device includes: a camera module, a camera window formed to cover the camera module and installed in a first opening, a bracket receiving the camera window and the camera module and adhered to a rear cover by a third waterproof member, a fourth waterproof member adhering the window cover and the bracket, a second opening formed in the bracket and connected to the inside of the middle frame, and a filter member disposed in the second opening and blocking movement of water and forming a movement path of air, wherein a gap is formed between an edge of the rear cover forming the first opening and an edge of the camera window and a movement region is formed by a space between the rear cover and the bracket and connected to the second opening, such that air and water are introduced.

15 Claims, 13 Drawing Sheets

ELECTRONIC DEVICE

CROSS-REFERENCE TO RELATED APPLICATION

Pursuant to 35 U.S.C. § 119(a), this application claims the benefit of earlier filing date and right of priority to Korean Application No. 10-2017-0022525, filed on Feb. 20, 2017, the contents of which is incorporated by reference herein in its entirety.

BACKGROUND OF THE INVENTION

1. Field of the Invention

The present disclosure relates to an electronic device having a waterproof structure which can be used even under water.

2. Background of the Invention

Electronic devices may generally be classified as mobile (portable) terminals and stationary terminals according to a moveable state. Mobile terminals may also be classified as handheld terminals and vehicle mount terminals according to a user's carriage method.

Terminals have various functions in line with development of technologies. For example, terminals support more complicated functions such as capturing images or video, reproducing music or video files, playing games, receiving broadcast signals, and the like. By comprehensively and collectively implementing such functions, the mobile terminal may be embodied in the form of a multimedia player or a device. In order to support and increase functions of terminals, improvement of structural parts and/or software parts of terminals may be taken into consideration.

Recently, as a waterproof function of an electronic device has advanced, a waterproof structure for blocking an introduction of water has been developed. A camera module or a user input unit which is exposed to the outside requires a waterproof structure for blocking an introduction of water, and since performance of such a waterproof structure may not be tested until assembling is completed, causing inconvenience in terms of process and severe waste.

Also, when a vent hole configured to allow air to flow in and out from the inside of a terminal is exposed, elegant appearance of the terminal may deteriorate.

SUMMARY OF THE INVENTION

Therefore, an aspect of the detailed description is to provide an electronic device allowing a waterproof function to be tested before a camera module is installed in a terminal body.

To achieve these and other advantages and in accordance with the purpose of this specification, as embodied and broadly described herein, an electronic device includes: a terminal body including a display unit including a window cover and a display module, a middle frame, and a rear cover including a first opening; a first water proof member disposed between a front surface of the middle frame and the window cover and adhered to a region adjacent to an edge of the window cover and the middle frame; a second waterproof member disposed between a rear surface of the middle frame and the rear cover and adhered to a region adjacent to an edge of the rear cover and the middle frame; a camera module disposed between the middle frame and the rear cover; a camera window formed to cover the camera module and installed in the first opening; a bracket receiving the camera window and the camera module and adhered to the rear cover by a third waterproof member; a fourth waterproof member adhering the window cover and the bracket; a second opening formed in the bracket and connected to the inside of the middle frame; and a filter member disposed in the second opening and blocking movement of water and forming a movement path of air, wherein a gap is formed between an edge of the rear cover forming the first opening and an edge of the camera window and a movement region is formed by a space between the rear cover and the bracket and connected to the second opening, such that air and water are introduced.

In an embodiment, the bracket may include a base part and a side wall part protruding from the base part and allowing the camera module to be mounted therein, wherein the base part includes mounting region allowing the vent hole module to be mounted therein and including a hole connected to the terminal body, in a region adjacent to an opening region of the rear cover, whereby air may be introduced between the rear cover and the camera window.

In an embodiment, first and second fixed ribs may protrude from the base part and inserted into the rear case, and since the first and second fixed ribs are disposed with the camera module intervening therebetween, the camera module may be easily aligned.

According to the present disclosure, deformation of an appearance due to a change in atmospheric pressure in the waterproof terminal may be prevented by the vent hole module.

Also, since the bracket including the vent hole is first mounted on the rear cover, a waterproof function may be checked before the rear cover is assembled to the rear case, reducing manufacturing cost. Also, since the vent hole is not exposed to the rear cover, the appearance may be finer and the manufacturing process may be simplified.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
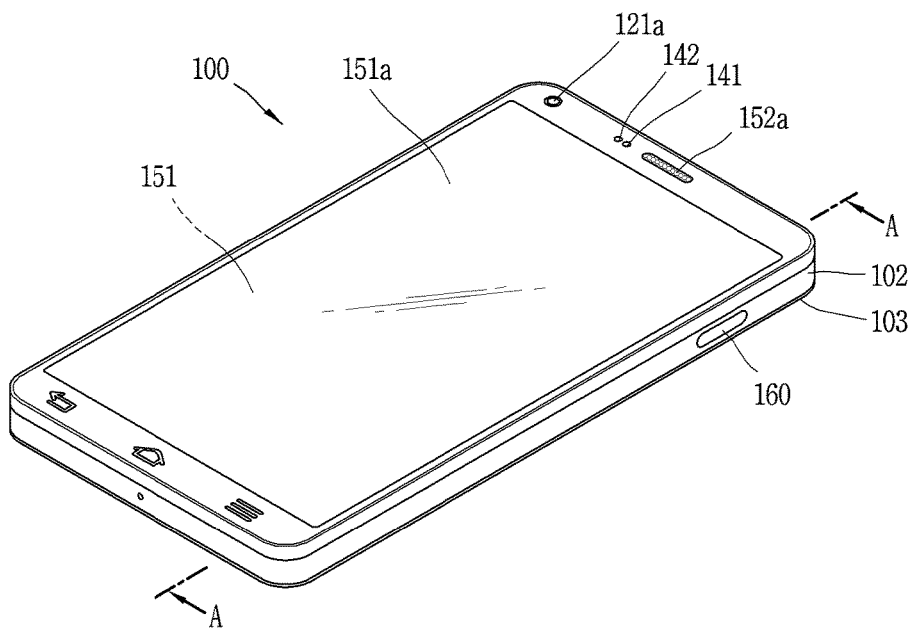
FIGS. 1A and 1B are views illustrating an electronic device according to an embodiment of the present disclosure, viewed in different directions.
Figure 1B:
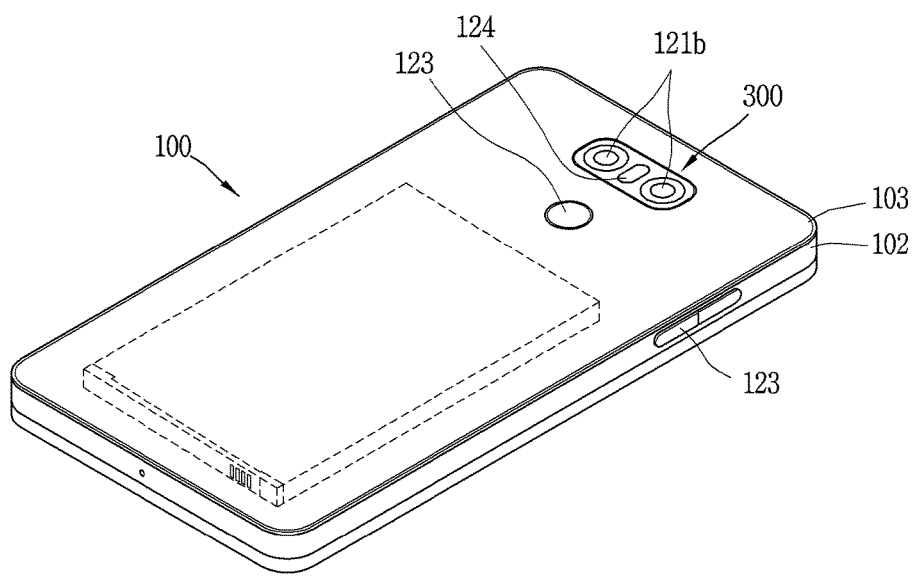

FIGS. 1A and 1B are views illustrating an electronic device according to an embodiment of the present disclosure, viewed in different directions.

Referring to FIGS. 1A and 1B, a disclosed electronic device 100 has a bar-type terminal body. However, the present disclosure is not limited thereto and may be applied to various structures such as a watch type, a clip type, a glass type, or a folder type, a flip type, a slide type, a swing type, a swivel type, and the like. In which two or more bodies are coupled to be relatively movable. The following descriptions related to a specific type of electronic device but may also be generally applied to any other types of electronic device.

Here, a terminal body may be understood as a concept of designating an electronic device 100 as at least one assembly.

The electronic device 100 includes a case (e.g., a frame, a housing, a cover, etc.) forming an appearance. As illustrated, the electronic device 100 may include a middle frame 102 and a rear cover 103. Or, the electronic device 100 according to an embodiment may include a front case and a rear case. Various electronic components are disposed in an internal space formed as the front case and the rear case are coupled.

A display unit 151 is disposed on a front side of the terminal body to output information. As illustrated, a window cover 151a of the display unit 151 is installed in the front case 101 to form a front side of the terminal body together with the front case 101.

According to circumstances, an electronic component may also be installed in the middle frame 102. An electronic component which may be installed in the middle frame 102 may include a detachable battery, an identifying module, a memory card, and the like. In this case, the rear cover 103 for covering the installed electronic component may be detachably coupled to the middle frame 102. Thus, when the rear cover 103 is separated from the middle frame 102, the electronic component installed in the middle frame 102 is exposed to the outside.

As illustrated, when the rear cover 103 is coupled to the middle frame 102, a portion of the side surface of the middle frame 102 may be exposed. According to circumstances, when the rear cover 103 is coupled, the middle frame 102 may be completely covered by the rear cover 103. Meanwhile, a first opening for exposing the camera module 121b or an audio output unit 152b to the outside may be provided in the rear frame 103.

The cases and frames may be formed by injection-molding a synthetic resin or may be formed of a metal, e.g., stainless steel (STS), aluminum (Al), titanium (Ti), and the like.

Unlike the example in which multiple cases provide an internal space for accommodating various electronic components, the electronic device 100 may be configured such that a single case forms the internal space. Here, the electronic device 100 of a uni-body in which a synthetic resin or metal is connected from a side surface to a rear surface may be implemented.

Meanwhile, the electronic device 100 may have a waterproof unit (not shown) preventing water from permeating to the inside of the terminal body. For example, the waterproof unit may include a waterproof member provided between the window cover 151a and the middle frame 102 or between the middle frame 102 and the rear cover 103 to hermetically close the internal space when these components are coupled.

In the electronic device 100, the display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160, and the like, may be provided.

Hereinafter, as illustrated in FIGS. 1A and 1B, an example of the electronic device 100 in which the display unit 151, the first audio output unit 152a, the proximity sensor 141, the illumination sensor 142, the optical output unit 154, the first camera 121a, and the first manipulation unit 123a are disposed on the front surface of the terminal body, the second manipulation unit 123b, the microphone 122, and the interface unit 160 are disposed on the side surface of the terminal body, and the second audio output unit 152b and the second camera module 121b are disposed on a rear surface of the terminal body will be described as an example.

However, these components are not limited to such a disposition, and these components may be excluded or replaced or may be disposed on different surface as necessary. For example, the first manipulation unit 123a may not be provided in the front surface of the terminal body and the second audio output unit 152b may be provided on the side surface of the terminal body, rather than in the rear surface of the terminal body.

The display unit 151 displays (outputs) information processed in the electronic device 100. For example, the display unit 151 may display execution screen information of an application program driven in the electronic device 100, user interface (UI) or graphic user interface (GUI) information according to the execution screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

Also, two or more display units 151 may be provided according to an implementation of the electronic device 100. In this case, a plurality of the display units may be integrally disposed or spaced apart from each other on one surface or may be disposed on different surfaces.

The display unit 151 may include a touch sensor for sensing a touch applied to the display unit 151 to receive a control command in a tactile manner. When a touch is applied to the display unit 151, the touch sensor may sense the touch and the controller 180 may be configured to generate a control command corresponding to the touch. Contents input in the tactile manner may be a character, a number or a menu item which can be indicated or designated in various modes.

Meanwhile, the touch sensor may be a metal wire configured as a film having a touch pattern and disposed between a window cover 151a and a display (not shown) on a rear surface of the window cover 151a or directly patterned on the rear surface of the window cover 151a. Or, the touch sensor may be integrally formed with the display. For example, the touch sensor may be disposed on the substrate of the display or provided within the display.

In this manner, the display unit 151 may form a touch screen together with the touch sensor, and in this case, the touch screen may also serve as a user input unit 123 (please refer to FIG. 1A). According to circumstances, the touch screen may replace at least some functions of the first manipulation unit 123a. Hereinafter, the display unit (display module) outputting an image and the touch sensor will be integrated to be called a touch screen 151.

The first audio output unit 152a may be implemented as a receiver transferring a call sound to the user's ear, and the second audio output unit 152b may be implemented as a loud speaker outputting various alarm sounds or a multimedia reproduction sound.

A sound hole for emitting a sound generated by the first audio output unit 152 may be provided in the window cover 151a. However, the present invention is not limited thereto and the sound may also be emitted along an assembly gap between structures (e.g., a gap between the window cover 151a and the front case 101). In this case, a hole independently formed to output a sound is not visible or concealed in appearance, simplifying the appearance of the electronic device 100.

The optical output unit 154 is configured to output light indicating an event when the event occurs. The event may be, for example, message reception, call signal reception, absent call, alarm, schedule notification, e-mail reception, reception of information through an application, and the like. When checking of an event by a user is sensed, the controller 180 may control the optical output unit 154 to terminate output of light.

The first camera 121a processes an image frame of a still image or video obtained by an image sensor in an image capture mode or a video call mode. The processed image frame may be displayed on the display unit 151 and may be stored in the memory 170.

The first and second manipulation units 123a and 123b are an example of the user input unit 123 operated to receive a command for controlling an operation of the electronic device 100 and may generally be called a manipulating portion. The first and second manipulation units 123a and 123b may employ any tactile method that allows the user to perform manipulation such as touch, push, scroll, or the like. Also, the first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received by the first and second manipulation units 123a and 123b may be configured in various ways. For example, the first manipulation unit 123a may receive a command such as a menu, home key, cancel, search, or the like, and the second manipulation unit 123b may receive a command such as control a volume level of a sound output from the first or second audio output modules 152a or 152b, switch to a touch recognition mode of the display unit 151, or the like.

As another example of the user input unit 123, a rear input unit (not shown) may be located on the rear surface of the terminal body. The rear input unit can be operated by a user to receive a command for controlling an operation of the electronic device 100. The input may be variously configured. For example, the rear input unit may receive a command such as power on/off, start, end, scroll, control volume level of a sound output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present disclosure is not limited thereto and a position of the rear input unit may be varied.

Alternatively, the rear input unit can be positioned at most any location of the rear side of the terminal body.

When the rear input unit is provided in the rear surface of the terminal body, a new type user interface may be implemented using the rear input unit. Also, the aforementioned touch screen or rear input unit may replace at least some functions of the first manipulation unit 123a provided on the front surface of the terminal body, so that when the first manipulation unit 123a is omitted in the front surface of the terminal body, the display unit 151 may have a larger screen.

Meanwhile, the electronic device 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is configured to receive a user's voice or any other sound. The microphone 122 may be provided in a plurality of spots to receive a stereo sound.

The interface unit 160 may serve as a path allowing the electronic device 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera module 121*b* may be located at the rear side of the terminal body. In this case, the second camera module 121*b* may have an image capture direction substantially opposite to that of the first camera 121*a*.

The second camera module 121*b* may include a plurality of lenses arranged along at least one line. The plurality of lenses may also be arranged in a matrix form. The cameras may be referred to as an "array camera." When the second camera module 121*b* is configured as an array camera, images may be captured in various manners using the plurality of lenses and images with better qualities may be obtained.

A flash 124 may be disposed to be adjacent to the second camera module 121*b*. When an image of a subject is captured with the second camera module 121*b*, the flash 124 may illuminate the subject.

The second audio output unit 152*b* may additionally be disposed on the terminal body. The second audio output unit 152*b* may implement stereophonic sound functions in conjunction with the first audio output unit 152*a*, and may be also used for implementing a speaker phone mode for call communication.

At least one antenna for wireless communication may be located on the terminal body. The antenna may be installed in the terminal body or formed on the case. For example, an antenna which forms a part of the broadcast receiving module 111 (please refer to FIG. 1A) may be retractable into the terminal body. Alternatively, an antenna may be formed using a film attached to an inner surface of the rear cover 103, or a case that includes a conductive material may be configured to serve as an antenna.

A power supply unit 190 (please refer to FIG. 1A) for supplying power to the electronic device 100 may be provided in the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be wirelessly recharged using a wireless charger. Wireless charging may be implemented by magnetic induction or electromagnetic resonance.

Meanwhile, the rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the electronic device 100 can also be provided on the electronic device 100. As one example of an accessory, a cover or pouch for covering or accommodating at least one surface of the electronic device 100 may be provided. The cover or pouch may cooperate with the display unit 151 to extend the function of the electronic device 100. Another example of the accessory is a touch pen for assisting or extending a touch input to a touch screen.

Figure 1C:
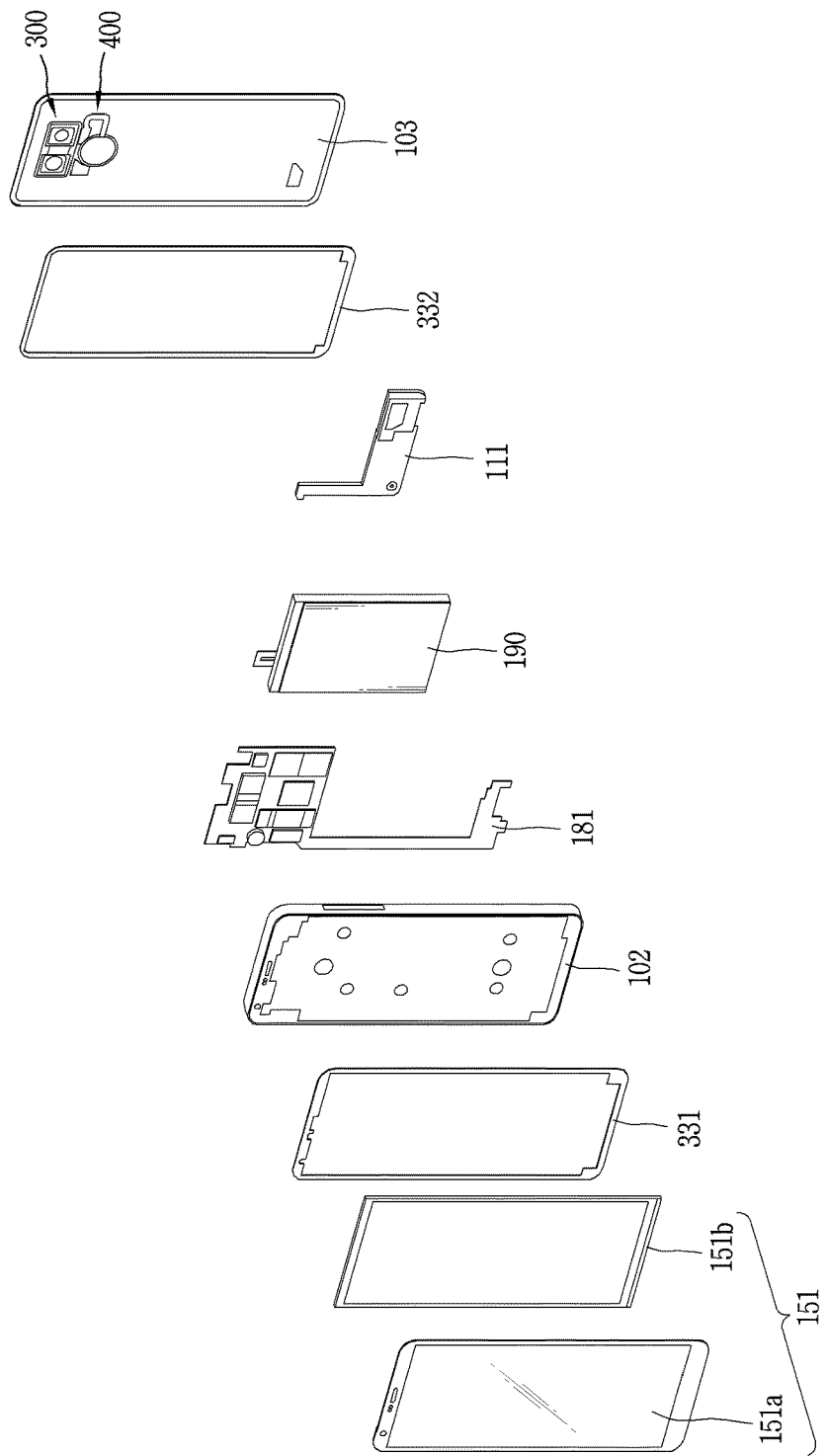
FIG. 1C is an exploded view of the electronic device of FIG. 1A according to an embodiment.

FIG. 1C is an exploded view of the electronic device of FIG. 1A according to an embodiment.

Referring to FIG. 1C, in the electronic device 100, the display unit 151 is disposed on an upper side and a main circuit board 181 is disposed on a lower side with respect to a middle frame 102. The display unit 151 disposed on the upper side includes the window cover 151*a* and a display module 151*b*. The display unit 151 may be an integrated display unit in which the window cover 151*a* and the display module 151*b* are integrated.

A first waterproof member 331 is disposed between the window cover 151*a* and the middle frame 102. The first waterproof 331 is configured to be adhered to a region adjacent to an edge of the window cover 151*a* and the middle frame 102. The first waterproof member 331 is formed of a waterproof adhesive member and adheres the window cover 151*a* and the middle frame 102.

Meanwhile, a second waterproof member 332 is disposed between the middle frame 102 and the rear cover 103. The second waterproof member 332 is adhered to a region adjacent to an edge of the middle frame 102 and the rear cover 103, and adheres the middle frame 102 and the rear cover 103. The second waterproof member 332 is configured as a waterproof adhesive member.

A plurality of electronic components including the main circuit board 181, the power supply unit 190, and the wireless communication unit 111 are disposed between the middle frame 102 and the rear cover 103.

Inflow of water to an internal space formed by the middle frame 102, the rear cover 102, and the window cover 151*a* is prevented by the first and second waterproof members 331 and 332.

Meanwhile, the rear cover 103 includes a plurality of openings for receiving a camera unit 300 and a button unit 400, and the electronic device 100 according to the present disclosure includes a waterproof structure of the openings. The waterproof structure will be described with reference to FIGS. 2A to 2C and 6A and 6B.

Figure 1D:
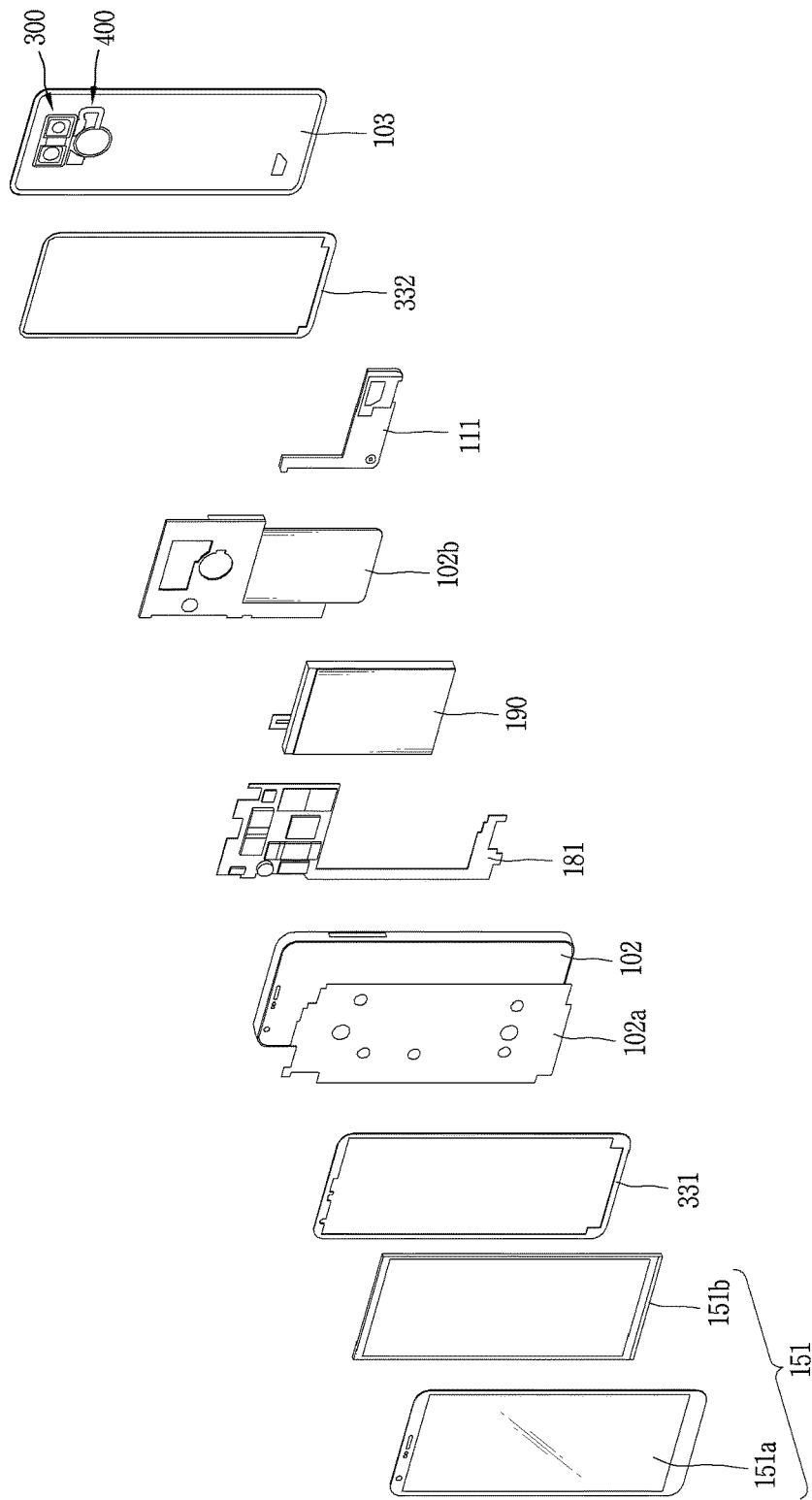
FIG. 1D is an exploded view of the electronic device of FIG. 1A according to another embodiment.

FIG. 1D is an exploded view of the electronic device of FIG. 1A according to another embodiment.

Referring to FIG. 1D, the electronic device 100 of FIG. 1D includes components substantially the same as those of the electronic device 100 of FIG. 1C, except first and second frames 102*a* and 102*b*. Thus, the same reference numerals are given to the same components and redundant descriptions will be omitted.

The first frame 102*a* is disposed between the middle frame 102 and the display unit 151. The display module 151*b* is mounted on the first frame 102*a*. Although not shown, the window cover 151*a* may be adhered to the first frame 102*a* by the first waterproof member 331.

The second frame 102*b* is disposed between the middle frame 102 and the rear cover 103. The second frame 102*b* forms a receiving space in which the camera unit 300 and the button unit 400 are to be received, and forms a receiving space of the power supply unit 190. The second frame 102*b* is fixed to the middle frame 102.

The electronic device according to the present disclosure includes the camera unit 300 including the camera 121 and the flash 124. The camera unit 300 is disposed between the rear cover 103 and the middle frame 102 such that one region thereof is exposed to the rear cover 103. The rear cover 103 includes a first opening and a camera window 320 (please refer to FIG. 2A) included in the camera unit 300 is exposed. The bracket 310 includes a pair of openings 310a configured to allow one region of the camera module 121b to be exposed and a flash hole 310b allowing the flash 24 to penetrate therethrough.

The camera window 320 does not protrude from the rear cover 103, and the camera window 320 and the rear cover 103 may form a flat surface. Thus, damage to the camera window 320 may be minimized and a thickness of the electronic device 100 may by minimized.

Meanwhile, the electronic device 100 according to the present disclosure includes a waterproof structure blocking movement of water which may be introduced between the camera window 320 and the rear cover 103. The waterproof structure may include a waterproof adhesive sheet for adhering each component of the camera unit 300 and the rear cover 103.

The electronic device 100 according to the present disclosure further includes a filter member 330 blocking movement of water and forming a path allowing an external air to move therealong with the terminal body. The filter member 330 includes a vent hole covered by a film formed of a mesh material blocking movement of water and allowing for movement of air. The filter member 300 is disposed within the rear cover and the vent hole is not exposed to the outside. Thus, the appearance may be simple. Hereinafter, the camera unit 300 having the filter member 330 will be described.

Figure 2A:
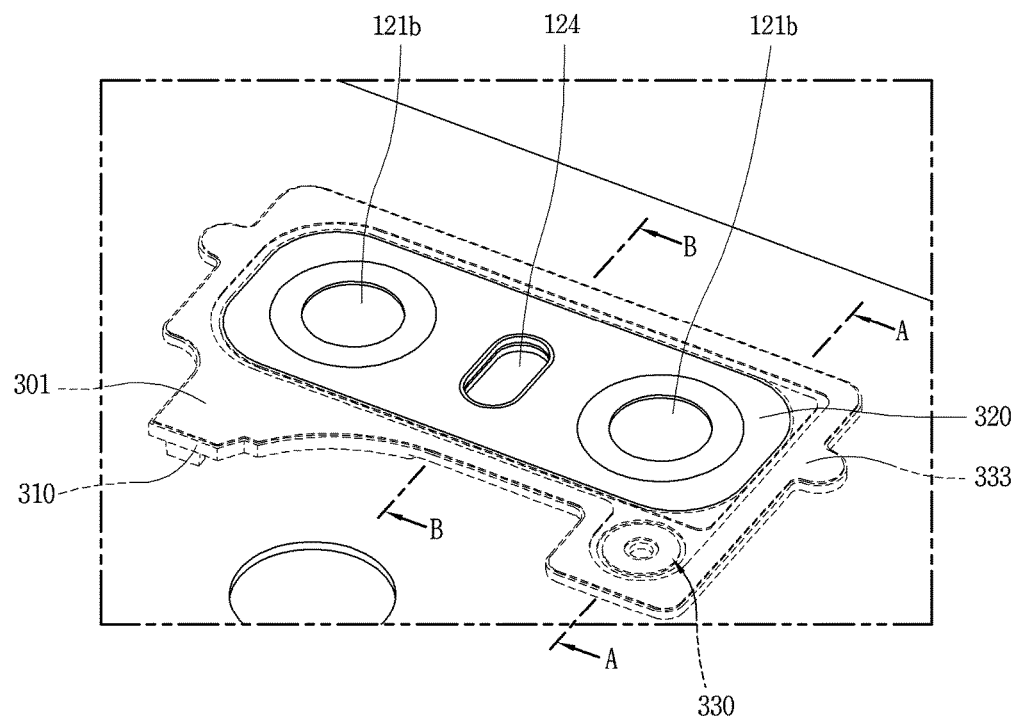
FIG. 2A is a conceptual view illustrating a camera module adhered to a rear cover.
Figure 2B:
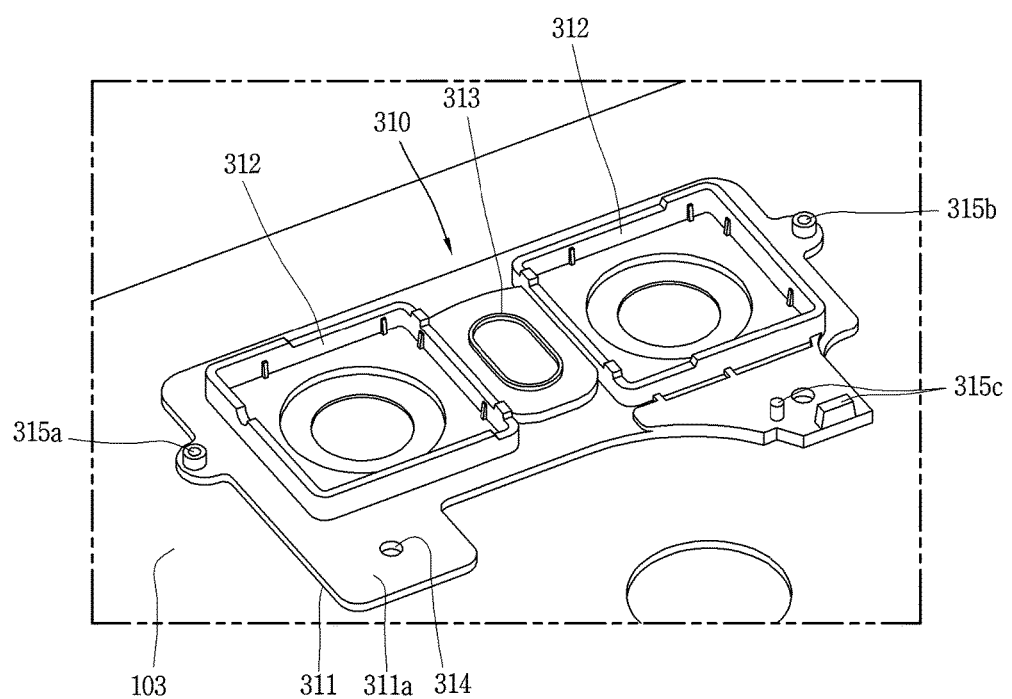
FIG. 2B is a conceptual view illustrating a structure of a bracket adhered to a rear cover.
Figure 2C:
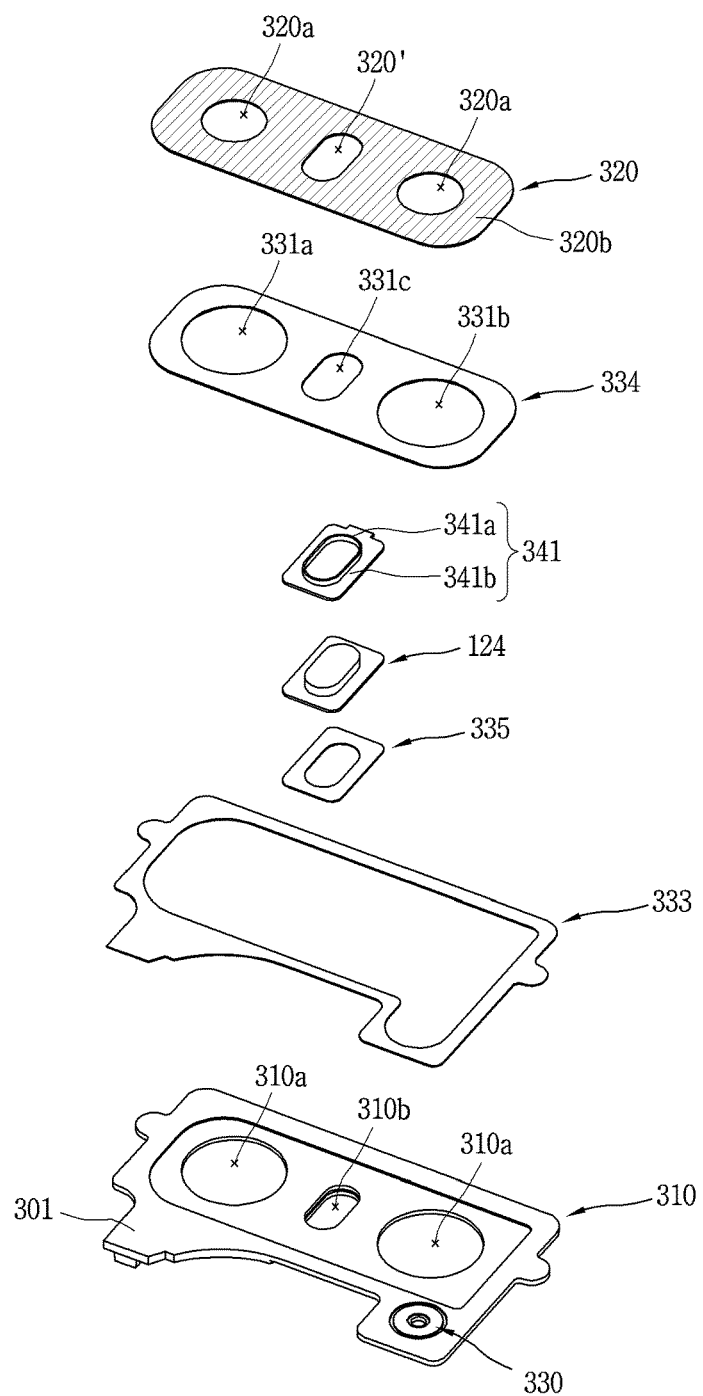
FIG. 2C is an exploded perspective view of a waterproof camera module installed in a rear cover.

FIG. 2A is a conceptual view illustrating a camera module adhered to a rear cover, FIG. 2B is a conceptual view illustrating a structure of a bracket adhered to a rear cover, and FIG. 2C is an exploded perspective view of a waterproof camera module installed in a rear cover.

Figure 3A:
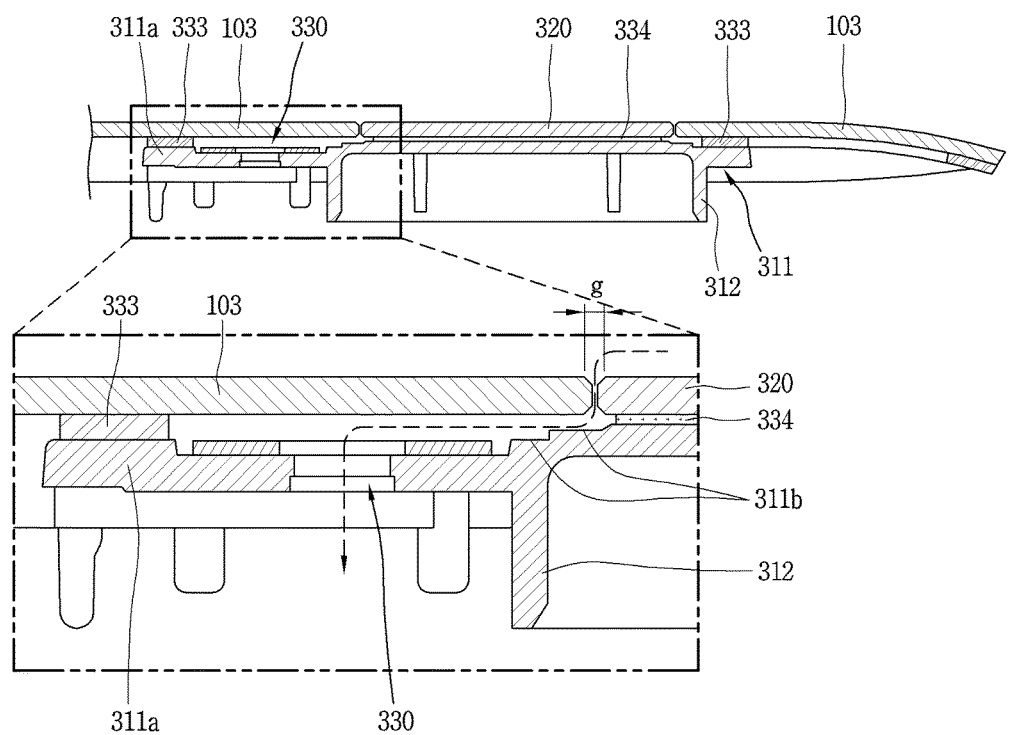
FIG. 3A is a cross-sectional view taken along line A-A of FIG. 2A.
Figure 3B:
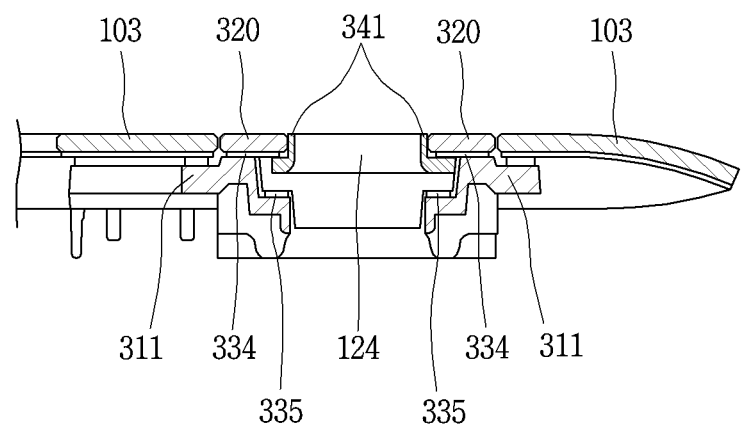
FIG. 3B is a cross-sectional view taken along line B-B of FIG. 2A.

FIG. 3A is a cross-sectional view taken along line A-A of FIG. 2A, and FIG. 3B is a cross-sectional view taken along line B-B of FIG. 2A.

Referring to FIGS. 2A and 2B, the camera unit 300 includes a bracket 310 receiving the camera module 121b and the flash 124, the camera window 320 fixed to the bracket 310 and exposed through the first opening of the rear cover 103, and the filter member 330 mounted in one region of the bracket 310.

The bracket 310 includes a base part 311, a pair of first side wall parts 312 protruding from the base part 31 to form a mounting space of the camera module 121b, and a second side wall part 313 forming a mounting space of the flash 124. The pair of camera modules 121b may be disposed with the flash 124 intervening therebetween.

The bracket 310 includes first to third fixed ribs 315a, 315b, and 315c protruding from the base part 311 and inserted into the middle frame 102. The first and second fixed ribs 315a and 315b are provided to be symmetrical with the pair of camera modules 121b intervening therebetween. Accordingly, in cases where the camera unit 300 in a state of being mounted on the rear cover 103 is fixed to the middle frame 102, assembling is guided such that arrangement of the pair of camera modules 121b is distorted.

Referring to FIGS. 2A and 3A, the camera window 320 includes an opening 320' allowing the flash 124 to be exposed therethrough, and is formed to cover the pair of camera modules 121b. The camera window 320 includes a light-transmissive region 320a and a non-light-transmissive region 320b. The light-transmissive region 320a corresponds to a region in which the camera module 121b is disposed, and is formed to allow light to pass therethrough. The non-light-transmissive region 320b is a region in which the camera module 121b is not disposed, and a non-light-transmissive printed layer is formed in the non-light-transmissive region 320b to block movement of light.

The camera window 320 is adhered to the bracket 310 by a fourth waterproof member 334. The fourth waterproof member 334 is formed on the edges of the camera window 320 to block movement of water between the camera window 320 and the camera module 121b. That is, the fourth waterproof member 334 includes holes 331a, 331b, and 331c corresponding to the opening hole 320' and the light-transmissive regions 320a.

A size of the first opening of the rear cover 103 may be equal to or greater than a size of the camera window 320 such that the camera window 320 may be mounted thereon. Thus, air and water may be introduced between the camera window 320 and the first opening.

Water introduced to the gap between the first opening and the camera window 320 may flow to a region of the bracket 310 on which the camera window 320 is mounted. However, the water may not flow to the camera module 121b due to the presence of the fourth waterproof member 334.

The base part 311 of the camera unit 300 is adhered to the rear cover 103 by a third waterproof member 333. The base part 311 is adhered to an inner surface of the rear cover 103, and the third waterproof member 333 is formed to cover the first opening of the rear cover 103. Thus, water introduced between the rear cover 103 and the camera window 320 cannot move to outside of the bracket 310. Thus, an introduction of water to the middle frame 102 may be blocked by the third waterproof member 333.

Meanwhile, the base part 310 includes a mounting region 311a on which the filter member 330 is to be mounted. The mounting region 311a may be formed to be adjacent to a region in which the camera module 121b is to be received. The filter member 330 is formed as a film formed of a mesh material to allow air to be introduced therethrough, while blocking an introduction of water.

Meanwhile, the mounting region 311a of the bracket 310 includes a hole 314 corresponding to a region on which the filter member 330 is mounted. The hole 314 communicates with the inside of the middle frame 102. Thus, movement of air with the middle frame is possible by the filter member 330.

Air may move to the middle frame 102 through the filter member 330.

The filter member 330 is disposed to be adjacent to the edge of the camera window 320. A gap g is formed between the camera window 320 and the rear cover 103 in terms of an assembly process, and water and air is introduced through the gap g. Water and air introduced through the gap g flow along the bracket 310 to reach the filter member 330. Here, only air may move to the inside of the terminal through the filter member 330.

The mounting region 311a on which the filter member 330 is mounted is covered by the rear cover 103. That is, the filter member 330 is covered by the rear cover 103 so as not to be exposed to the outside. The third waterproof member 333 is not formed in a space between the filter member 330 and the camera window 320.

That is, the camera unit 300 in which the filter member 330 is installed includes a first opening through which both water and air are introduced and a second opening configured to block movement of water and allowing for movement of only air. The first opening is implemented by a gap between the rear cover 103 and the camera window 320, and the second opening is implemented by a hole included in the filter member 330. The first and second openings are connected to each other, and air introduced through the first opening may be introduced to an internal space of the rear case 102 through the filter member 330.

The filter member 330 is disposed to be adjacent to an edge of the camera window 320 and disposed to be adjacent to the adhesive layer 310. The filter member 330 does not overlap the camera window 320 and overlaps the rear cover 103 so as not to be exposed to an outer surface of the electronic device 100. Thus, the outer surface may be implemented to be simpler, and since there is no need to form a hole in the rear cover, a manufacturing process of the rear cover may be simplified and there is no limitation in material.

Referring to FIG. 3A, the bracket 310 includes a step region 311b formed between a region supporting the camera window 320 and the mounting region 311a and having a height lower than those of other regions. Thus, the third waterproof member 333 is not formed in the step region 311b and water and air may move therein. The third waterproof member 333 is adhered to the mounting region 311a formed an edge. A space may be formed with the rear cover 103 by the step region 311b.

That is, on the basis of the step region 311b, the region where the third waterproof member 333 is formed is distinguished from other regions, and air may easily move according to the step region 311b.

Referring to FIGS. 2A and 3B, the flash 124 is exposed to the outside through the bracket 310 and the camera window 320, and does not protrude, relative to the rear cover 103. The rear cover 103 and the flash 125 may form one surface.

The camera unit 300 further includes a deco part 341 surrounding the flash 124 and exposed to the outside through the opening region. The deco part 341 includes an exposed region 341a in which one end portion thereof is exposed through the opening region and a bent region 341b bent to be arrested by the camera window 320.

A fifth waterproof member 335 is formed between the flash 124 and the bracket 310. The fifth waterproof member 335 blocks a movement path of water introduced to a gap between the flash 124 and the bracket 310. Thus, water introduced to the inside of the flash 125 may be blocked and a waterproof structure may be formed.

Figure 4A:
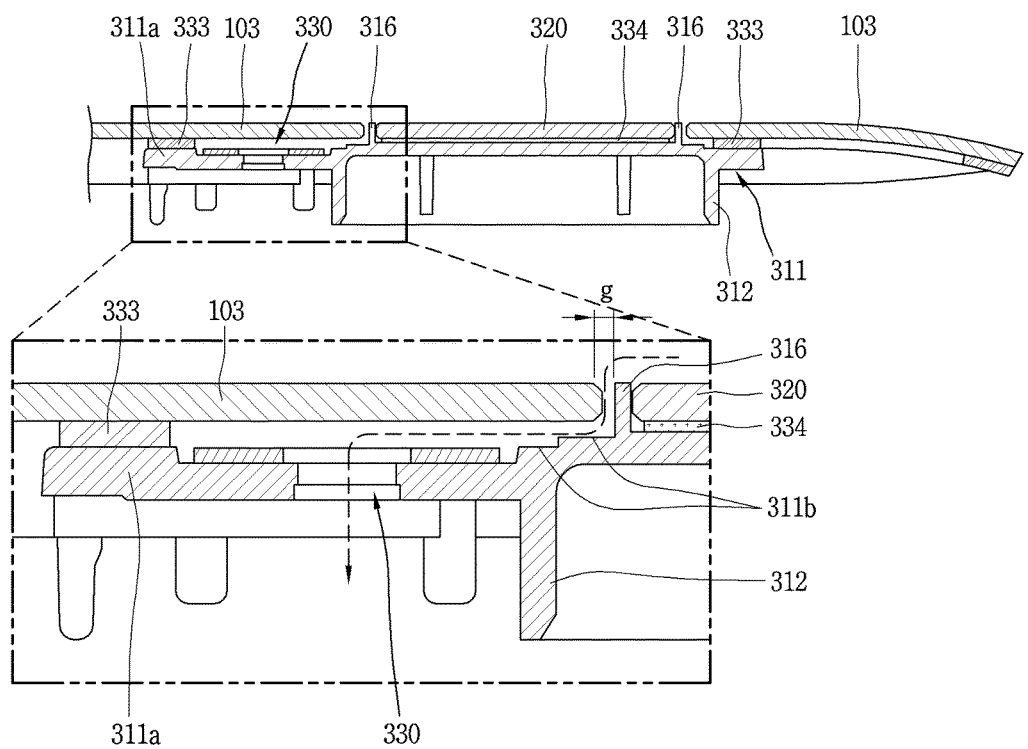
FIGS. 4A and 4B are conceptual views illustrating a camera module according to another embodiment.
Figure 4B:
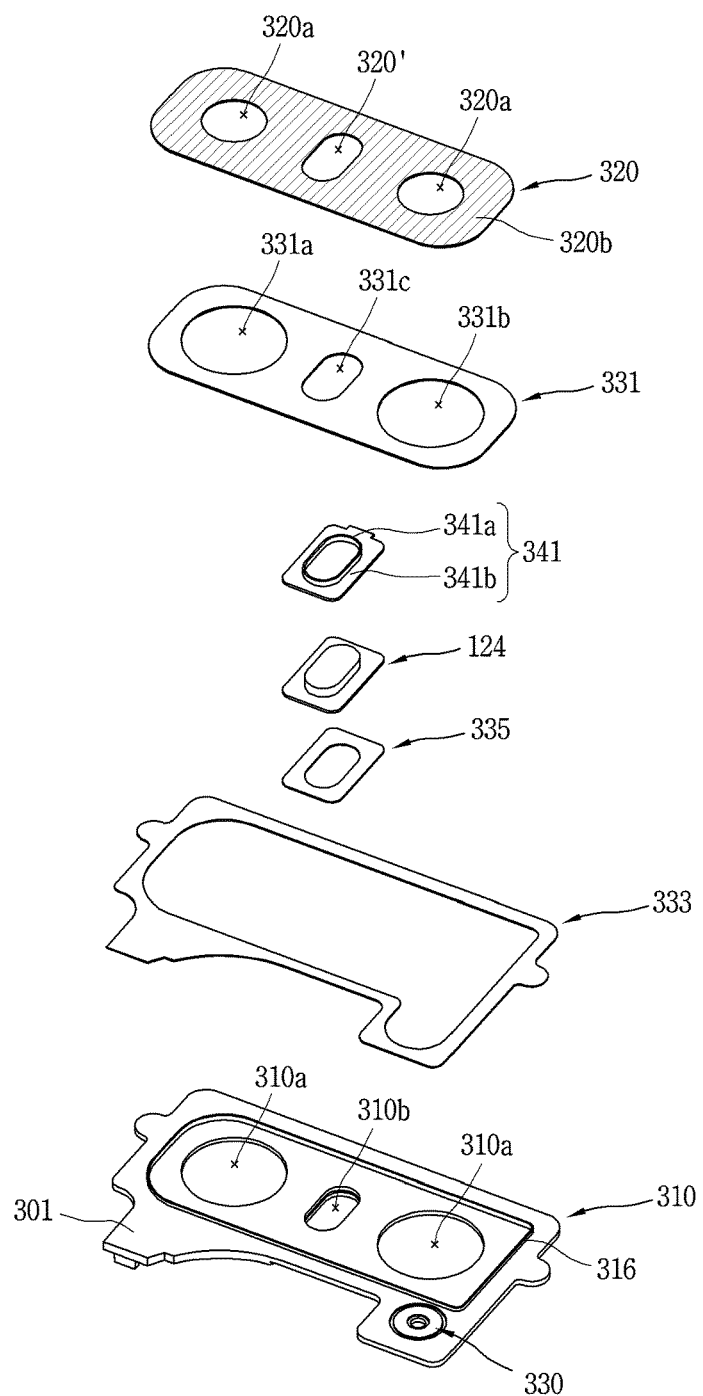

FIGS. 4A and 4B are conceptual views illustrating a camera module according to another embodiment.

Referring to FIGS. 4A and 4B, the bracket 310 further includes a deco part 316 covering the camera window 320 and exposed to the outside. Components of the camera module according to the present embodiment are substantially the same as those of the camera unit 300 of FIGS. 2A to 3B, except the deco part 316, and thus, redundant descriptions thereof will be omitted.

The first side wall part 312 protrudes from one surface of the base part 301, and the deco part 316 protrudes from the other surface of the base part 301. The deco part 316 is formed along the edge of the camera window 320 and may have a thickness substantially same as that of the camera window 320 and the fourth waterproof member 334.

The deco part 316 is preferably formed to be close to an edge of the camera window 320, and a gap g is formed between the deco part 316 and the rear cover 103. That is, the filter member 330 is disposed to be adjacent to the deco part 316.

According to the present embodiment, water and air are introduced through the gap g between the deco part 316 and the rear cover 103 and move toward the filter member 330 along the step region 331b. The filter member 330 may block movement of water and allow air to be introduced therethrough.

Figure 5A:
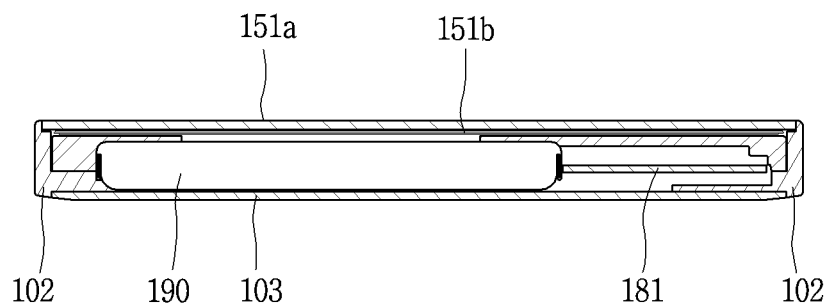
FIGS. 5A and 5B are cross-sectional views taken along line A-A of the electronic device of FIG. 1A.
Figure 5B:
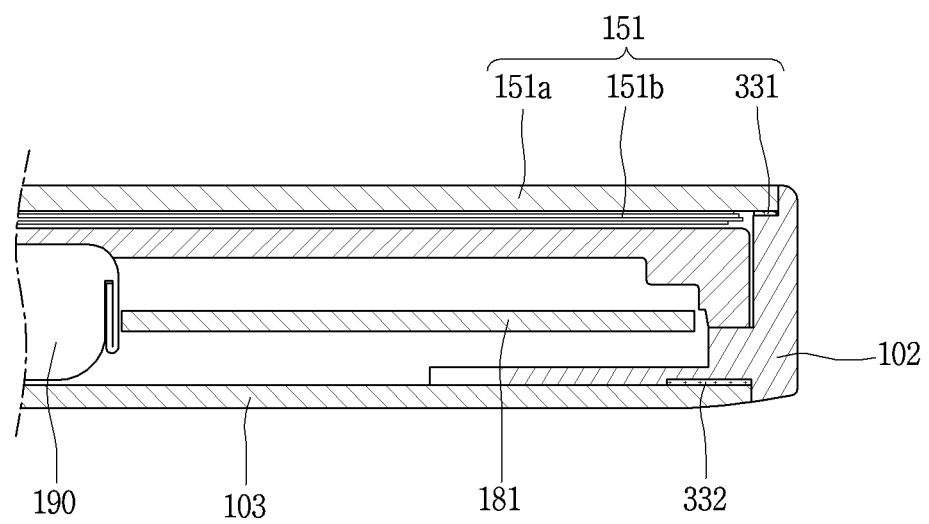

FIGS. 5A and 5B are cross-sectional views taken along line A-A of the electronic device of FIG. 1A.

Referring to FIGS. 1A, 1C, 5A, and 5B, a plurality of electronic devices including the power supply unit 190 are disposed between the window cover 151a and the rear cover 103. The main circuit board 181 is disposed in an internal space formed by the rear cover 103 and the window cover 151a.

The rear cover 103 and the window cover 151a are adhered by the first and second waterproof members 331 and 332. Also, a waterproof structure is disposed in a hole formed for performing functions of the respective electronic components. Thus, a movement path of a fluid is blocked within the electronic device 100. By the structure blocking movement of water and allowing for movement of air by the filter member according to the present disclosure, deformation due to a difference in pressure between the inside and outside of the electronic device 100 may be prevented.

The electronic device 100 according to the present disclosure includes the waterproof structure and includes the button unit 400 mounted on the rear cover 103. Structural features of the button unit 400 disposed to be adjacent to the camera unit 300 will be described with reference to FIGS. 6A and 6B.

Figure 6A:
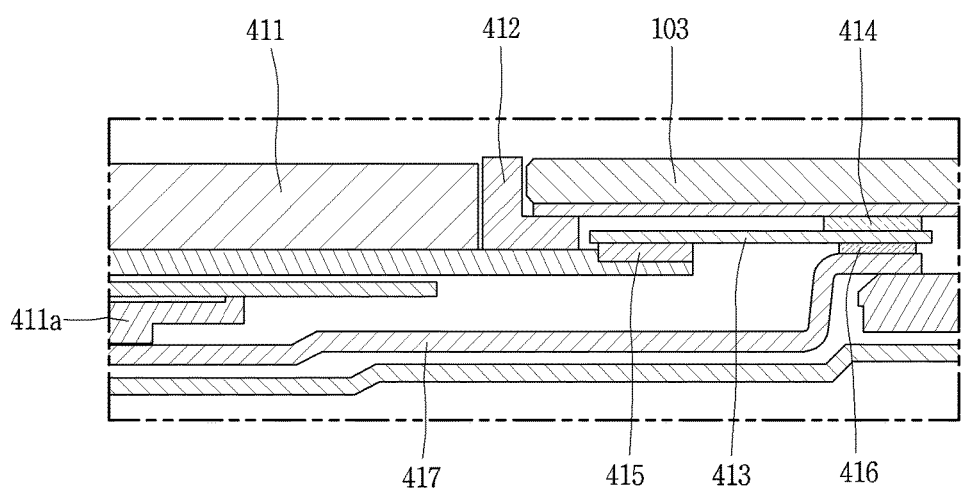
FIG. 6A is a cross-sectional view illustrating a button unit.
Figure 6B:
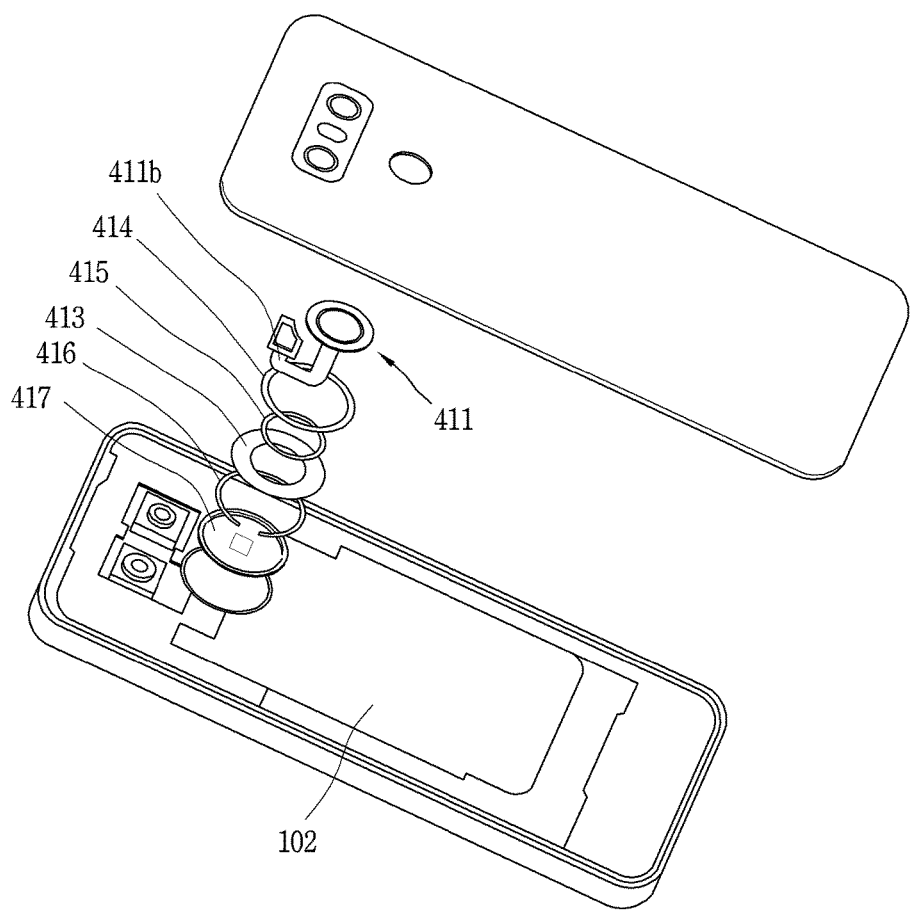
FIG. 6B is an exploded view illustrating a structure of a button unit.

FIG. 6A is a cross-sectional view illustrating a button unit, and FIG. 6B is an exploded perspective view illustrating a structure of a button unit.

Referring to FIGS. 6A and 6B, the rear cover 103 includes a third opening. The third opening is formed in a region adjacent to the first opening and configured such that at least a region of the button unit 400 is exposed.

The button unit 400 includes a fingerprint recognition button module 411, a dome switch part 411a connected to the fingerprint recognition button module 411, a flexible circuit board 411b, a deco bracket 412, a rubber flange 413, a sixth waterproof member 414, a seventh waterproof member 415, a dome adhesive member 416, and a dome bracket 417.

The fingerprint recognition button module 411 includes a fingerprint sensor formed in a region exposed by the third opening of the rear cover 103, and also includes a press key module moved by an external force.

The deco bracket 412 is formed to surround an outer circumferential surface of the fingerprint recognition button module 411 and is formed such that a region thereof is exposed to the outside and another bent region is arrested by the rear cover 103. The flexible printed board 411b and the dome switch part 411a are disposed in a region of the bent deco bracket 412.

The flexible circuit board 411b is adhered to the rubber flange 413 by the seventh waterproof member 415, and the rubber flange 413 is adhered to the rear cover 103 by the sixth waterproof member 414. Since the rubber flange 413 is formed of deformable rubber, the rubber flange 413 is deformed when an external force is applied to the fingerprint recognition button module 411, whereby a signal may be applied to the dome switch part 411a.

The dome switch part 411a is mounted on the dome bracket 417. The adhesive member 416 is formed in a region adjacent to an edge of the dome bracket 417 to adhere the dome bracket 417 and the rubber flange 413.

Referring to FIG. 6, water introduced to a gap formed between the deco bracket 412 and the rear cover 103 is prevented from moving to the inside of the dome bracket 417 due to the presence of the seventh waterproof member 415 and is prevented from moving to an internal space of the rear cover 103 due to the presence of the sixth waterproof member 414.

Thus, water and air may not be introduced to the third opening of the rear cover 103 where a button unit which can be pressed is disposed.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
a terminal body including a display unit including a window cover and a display module, a middle frame, and a rear cover including a first opening;
a first water proof member disposed between a front surface of the middle frame and the window cover and adhered to a region adjacent to an edge of the window cover and the middle frame;
a second waterproof member disposed between a rear surface of the middle frame and the rear cover and adhered to a region adjacent to an edge of the rear cover and the middle frame;
a camera module disposed between the middle frame and the rear cover;
a camera window formed to cover the camera module and installed in the first opening;
a bracket receiving the camera window and the camera module and adhered to the rear cover by a third waterproof member;
a fourth waterproof member adhering the window cover and the bracket;
a second opening formed in the bracket and connected to the inside of the middle frame; and
a filter member disposed in the second opening and blocking movement of water and forming a movement path of air,
wherein a gap is formed between an edge of the rear cover forming the first opening and an edge of the camera window and a movement region is formed by a space between the rear cover and the bracket and connected to the second opening, such that air and water are introduced therethrough.

2. The electronic device of claim 1, wherein
the bracket includes:
a base part; and
first and second fixed ribs protruding from the base part and inserted into the middle frame,
wherein the first and second fixed ribs are disposed with the camera module intervening therebetween.

3. The electronic device of claim 2, wherein
one surface of the base part includes a step region forming a space separated from the rear cover to form the space from the gap to the filter member.

4. The electronic device of claim 3, wherein
the base part includes a mounting region supporting the filter member and including a vent hole, and
the mounting region is disposed to be adjacent to the step region.

5. The electronic device of claim 2, further comprising:
first and second fixed ribs protruding from the base part and inserted into the middle frame,
wherein the first and second fixed ribs are disposed with the camera module intervening therebetween.

6. The electronic device of claim 1, wherein
the camera window and the rear cover form a plane including the gap.

7. The electronic device of claim 1, further comprising:
a flash disposed in the first opening and having at least one region outwardly exposed through an opening hole formed in the camera window, and
a fifth waterproof member is formed between the flash and the camera bracket to block an introduction of water to the inside of the flash.

8. The electronic device of claim 1, wherein
the bracket further includes a deco part protruding from one surface of the bracket along an edge of the camera window and disposed in the gap, and
water and air are introduced between the deco part and the rear cover.

9. The electronic device of claim 8, wherein
the filter member is disposed to be adjacent to the deco part.

10. The electronic device of claim 9, wherein
the bracket further includes a step region formed between the filter member and the deco part on one surface of the bracket, and recessed to allow the water and air to move therein.

11. The electronic device of claim 1, wherein
the rear cover further includes a third opening formed in a region adjacent to the first opening and further includes a button unit exposed in at least one region through the third opening.

12. The electronic device of claim 11, further comprising:
a support member supporting the button unit; and
a sixth waterproof member adhering the support member and the rear cover.

13. The electronic device of claim 1, further comprising:
a first frame disposed between the display unit and the middle frame and fixing the display module.

14. The electronic device of claim 1, further comprising:
a second frame disposed between the rear cover and the middle frame.

15. The electronic device of claim 14, wherein
the second frame has a receiving space allowing the camera module to be installed therein.

\* \* \* \* \*